United States Patent
Xia et al.

(10) Patent No.: US 10,581,979 B2
(45) Date of Patent: Mar. 3, 2020

(54) INFORMATION TRANSMISSION METHOD AND APPARATUS

(71) Applicant: Huawei Technologies Co., Ltd., Shenzhen (CN)

(72) Inventors: Haitao Xia, Beijing (CN); Chunshan Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 472 days.

(21) Appl. No.: 15/261,503

(22) Filed: Sep. 9, 2016

(65) Prior Publication Data

US 2016/0381147 A1    Dec. 29, 2016

Related U.S. Application Data

(63) Continuation of application No. PCT/CN2014/073183, filed on Mar. 11, 2014.

(51) Int. Cl.
*G06F 15/16* (2006.01)
*H04L 29/08* (2006.01)
(Continued)

(52) U.S. Cl.
CPC .......... *H04L 67/142* (2013.01); *H04L 61/203* (2013.01); *H04L 67/141* (2013.01);
(Continued)

(58) Field of Classification Search
CPC ....................................................... H04L 67/20
See application file for complete search history.

(56) References Cited

U.S. PATENT DOCUMENTS

| 2004/0268358 | A1 | 12/2004 | Darling et al. |
| 2010/0281170 | A1 | 11/2010 | Rui et al. |

(Continued)

FOREIGN PATENT DOCUMENTS

| CN | 101217789 A | 7/2008 |
| CN | 101227391 A | 7/2008 |

(Continued)

OTHER PUBLICATIONS

"$3^{rd}$ Generation Partnership Project; Technical Specification Group Core Network and Terminals; Study on XML based access of AF to the PCRF (Release 12)," 3GPP TR 29.817, V2.0.0, pp. 1-63, $3^{rd}$ Generation Partnership Project, Valbonne, France (Feb. 2014).

(Continued)

*Primary Examiner* — Kevin T Bates
*Assistant Examiner* — Clarence D McCray
(74) *Attorney, Agent, or Firm* — Leydig, Voit & Mayer, Ltd.

(57) ABSTRACT

An information transmission method is provided. An apparatus receives a first session request from a third party application function, which includes identity information of the third party application function and identity information of a destination entity in a network. The apparatus establishes a first session with the third party application function; sends a second session request to the destination entity, which includes identity information of an anchor entity and the identity information of the third party application function. The apparatus establishes a second session with the destination entity; receives information reported by the destination entity, which includes a report event and identity information of the third party application function. The apparatus forwards the report event to the corresponding third party application function according to the identity information of the third party application function included (Continued)

in the information. Correct identification and forwarding of a packet flow is achieved.

19 Claims, 7 Drawing Sheets

(51) Int. Cl.
*H04L 29/12* (2006.01)
*H04W 76/10* (2018.01)

(52) U.S. Cl.
CPC ............ *H04L 67/143* (2013.01); *H04L 67/20* (2013.01); *H04W 76/10* (2018.02); *H04L 67/02* (2013.01)

(56) References Cited

U.S. PATENT DOCUMENTS

| | | | |
|---|---|---|---|
| 2010/0284336 A1 | 11/2010 | Rui et al. | |
| 2011/0161504 A1* | 6/2011 | Zhou ................. | H04W 76/10 709/227 |
| 2011/0202635 A1* | 8/2011 | Yeung ................ | H04L 12/1407 709/219 |
| 2013/0003655 A1* | 1/2013 | Dietz ................. | H04L 65/1016 370/328 |
| 2013/0287012 A1 | 10/2013 | Pragada et al. | |
| 2014/0112133 A1* | 4/2014 | Xia .................... | H04L 12/1407 370/230 |
| 2014/0164633 A1 | 6/2014 | Bi et al. | |
| 2015/0256415 A1* | 9/2015 | Williamson ........... | H04L 67/02 709/223 |
| 2018/0109632 A1* | 4/2018 | Stammers ............ | H04L 67/148 |

FOREIGN PATENT DOCUMENTS

| | | |
|---|---|---|
| CN | 101583112 A | 11/2009 |
| CN | 102158562 A | 8/2011 |
| CN | 102223240 A | 10/2011 |
| CN | 102300263 A | 12/2011 |
| CN | 102905390 A | 1/2013 |
| EP | 2466828 A1 | 6/2012 |
| RU | 2387002 C2 | 4/2010 |
| WO | 2012119488 A1 | 9/2012 |
| WO | 2013163595 A2 | 10/2013 |

OTHER PUBLICATIONS

3$^{rd}$ Generation Partnership Project; Technical Specification Group Core Network and Terminals; Policy and Charging Control over Rx reference point (Release 12), 3GPP TS 29.214, V12.3.0, pp. 1-59, 3$^{rd}$ Generation Partnership Project, Valbonne, France (Mar. 2014).

* cited by examiner

INFORMATION TRANSMISSION METHOD AND APPARATUS

CROSS-REFERENCE TO RELATED APPLICATIONS

This application is a continuation of International Application No. PCT/CN2014/073183, filed on Mar. 11, 2014, which is hereby incorporated by reference in its entirety.

TECHNICAL FIELD

The present invention relates to the field of communications technologies, and in particular, to an information transmission method and apparatus.

BACKGROUND

With the continuous development of information technologies, an interaction mode between a mobile network operator and a third party service provider increasingly tends to be an XML (Extensible Markup Language) mechanism: An anchor entity in a network and a third party application function establish an HTTP (Hypertext Transfer Protocol) connection, and the anchor entity and another entity in a network (that is, a destination entity, with which the third party application function requests to establish a session, in a network) establish a Diameter (where the Diameter protocol is an upgrade version of the RADIUS protocol) session. In this case, the anchor entity is used as an agent to perform addressing for the third party application function, so as to enable the third party application function to access an operator network, to implement interaction between the third party application function and the destination entity in the network. The anchor entity may be understood as a network edge device that is in a mobile network and can directly communicate with an out-of-network device (for example, the third party application function). Referring to a schematic diagram shown in FIG. 1, a Protocol Converter PCin the figure is used as an anchor entity to establish an HTTP connection to a third party application function AF, and establish a Diameter session with a destination entity PCRF (Policy and Charging Rules Function) in a network with which the application function expects to establish a session.

If in a process of establishing a session between the third party application function and the destination entity in the network, a case in which multiple application functions address a same PCRF by using a same Protocol Converter occurs, the Protocol Converter cannot determine that a flow in a session between the Protocol Converter and the PCRF is corresponding to which application function, thereby causing a problem that a packet flow flowing through the Protocol Converter cannot be accurately forwarded to a destination application function.

SUMMARY

An information transmission method and apparatus in the embodiments of the present invention are used to correctly forward, to a destination third party application function, a packet flow flowing through an anchor entity.

In view of this, the embodiments of the present invention provide the following technical solutions:

According to a first aspect, an embodiment of the present invention provides an information transmission apparatus, where the apparatus includes:

a session request receiving unit, configured to receive a first session request sent by a third party application function, where the first session request includes identity information of the third party application function and identity information of a destination entity in a network;

a first session establishing unit, configured to establish a first session with the third party application function;

a request sending unit, configured to send a second session request to the destination entity in the network, where the second session request includes identity information of an anchor entity and the identity information of the third party application function;

a second session establishing unit, configured to establish a second session with the destination entity in the network;

an information receiving unit, configured to receive information reported by the destination entity in the network, where the information includes a report event and identity information of the third party application function; and a forwarding unit, configured to forward the report event to the corresponding third party application function according to the identity information of the third party application function, where the identity information of the third party application function is included in the information.

In a first possible implementation manner of the first aspect, the session request receiving unit includes:

a connection establishing unit, configured to establish a websocket connection to the third party application function by means of one handshake; and a session request receiving subunit, configured to receive the first session request that is transmitted over the websocket connection by the third party application function.

In a second possible implementation manner of the first aspect, the apparatus maintains a list corresponding to the destination entity in the network, identity information of all third party application functions corresponding to the destination entity in the network is added in the list, and the apparatus further includes:

a termination request receiving unit, configured to receive a session termination request sent by a to-be-terminated third party application function, where the session termination request includes identity information of the to-be-terminated third party application function;

a determining unit, configured to determine whether only the identity information of the to-be-terminated third party application function is saved in the list;

a session termination unit, configured to empty the list and terminate the second session, when the determining unit determines that only the identity information of the to-be-terminated third party application function is saved in the list; and a deletion unit, configured to delete the identity information of the to-be-terminated third party application function that is saved in the list, when the determining unit determines that the identity information of the to-be-terminated third party application function is not the only identity information that is saved in the list.

With reference to the second possible implementation manner of the first aspect, in a third possible implementation manner, the apparatus further establishes a second session with other destination entities in a network according to a request of the third party application function, and maintains a list corresponding to each of the other destination entities in the network; and identity information of all third party application functions corresponding to the other destination entities in the network is added in the list, so that the session termination request received by the termination request receiving unit further includes the identity information of the destination entity in the network; and the apparatus further includes:

a searching unit, configured to search for a list, which is corresponding to the identity information of the destination entity in the network, from at least two maintained lists; and instruct the determining unit to determine whether only the identity information of the to-be-terminated third party application function is saved in a found list.

According to a second aspect, an embodiment of the present invention provides an information transmission apparatus, where the apparatus includes:

a session request sending unit, configured to send a first session request to an anchor entity, where the first session request includes identity information of a third party application function and identity information of a destination entity in a network, and the identity information of the third party application function is used to be forwarded to the destination entity in the network when the anchor entity sends a second session request to the destination entity in the network;

a first session establishing unit, configured to receive a response returned by the anchor entity, and establish a first session with the anchor entity; and an information receiving unit, configured to, after the anchor entity and the destination entity in the network establish a second session, receive a report event that is forwarded by the anchor entity according to the identity information of the third party application function, where identity information of the third party application function and the report event are sent by the destination entity in the network to the anchor entity.

In a first possible implementation manner of the second aspect, the session request sending unit includes:

a connection establishing unit, configured to establish a websocket connection to the anchor entity by means of one handshake; and a session request sending subunit, configured to transmit the first session request to the anchor entity over the websocket connection.

According to a third aspect, an embodiment of the present invention provides an information transmission method, where the method includes:

receiving, by an anchor entity, a first session request sent by a third party application function, where the first session request includes identity information of the third party application function and identity information of a destination entity in a network;

establishing, by the anchor entity, a first session with the third party application function, and sending a second session request to the destination entity in the network, where the second session request includes identity information of the anchor entity and the identity information of the third party application function;

establishing, by the anchor entity, a second session with the destination entity in the network, and receiving information reported by the destination entity in the network, where the information includes a report event and identity information of the third party application function; and forwarding, by the anchor entity, the report event to the corresponding third party application function according to the identity information of the third party application function, where the identity information of the third party application function is included in the information.

In a first possible implementation manner of the third aspect, the identity information of the third party application function includes at least one of: an IP address, a uniform resource locator URL, and a connection identifier;

the identity information of the destination entity in the network includes: a Diameter host identity of the destination entity in the network and an identity of a Diameter realm in which the destination entity in the network is located; or the identity information of the destination entity in the network includes: identity information of a user equipment; and the identity information of the anchor entity includes: a Diameter host identity of the anchor entity and an identity of a Diameter realm in which the anchor entity is located.

In a second possible implementation manner of the third aspect, the receiving, by an anchor entity, a first session request sent by a third party application function includes:

establishing, by the anchor entity, a websocket connection to the third party application function by means of one handshake; and receiving, by the anchor entity, the first session request that is transmitted over the websocket connection by the third party application function.

In a third possible implementation manner of the third aspect, the anchor entity maintains a list corresponding to the destination entity in the network, identity information of all third party application functions corresponding to the destination entity in the network is added in the list, and the method further includes:

receiving, by the anchor entity, a session termination request sent by a to-be-terminated third party application function, where the session termination request includes identity information of the to-be-terminated third party application function; and determining, by the anchor entity, whether only the identity information of the to-be-terminated third party application function is saved in the list; if the anchor entity determines that only the identity information of the to-be-terminated third party application function is saved in the list, emptying, by the anchor entity, the list and terminating the second session; and if the anchor entity determines that not only the identity information of the to-be-terminated third party application function is saved in the list, deleting, by the anchor entity, the identity information of the to-be-terminated third party application function that is saved in the list.

With reference to the third possible implementation manner of the third aspect, in a fourth possible implementation manner, the anchor entity further establishes a second session with other destination entities in a network according to a request of the third party application function, and maintains a list corresponding to each of the other destination entities in the network; and identity information of all third party application functions corresponding to the other destination entities in the network is added in the list, so that the session termination request further includes the identity information of the destination entity in the network, and the method further includes:

searching, by the anchor entity, for a list, which is corresponding to the identity information of the destination entity in the network, from at least two maintained lists; and performing the step of determining whether only the identity information of the to-be-terminated third party application function is saved in the list.

According to a fourth aspect, an embodiment of the present invention provides an information transmission method, where the method includes:

sending, by a third party application function, a first session request to an anchor entity, where the first session request includes identity information of the third party application function and identity information of a destination entity in a network, and the identity information of the third party application function is used to be forwarded to the destination entity in the network when the anchor entity sends a second session request to the destination entity in the network;

receiving, by the third party application function, a response returned by the anchor entity, and establishing a first session with the anchor entity; and after the anchor entity and the destination entity in the network establish a second session, receiving, by the third party application function, a report event that is forwarded by the anchor entity according to the identity information of the third party application function, where identity information of the third party application function and the report event are sent by the destination entity in the network to the anchor entity.

In a first possible implementation manner of the fourth aspect, the sending, by a third party application function, a first session request to an anchor entity includes:

establishing, by the third party application function, a websocket connection to the anchor entity by means of one handshake; and transmitting, by the third party application function, the first session request to the anchor entity over the websocket connection.

According to a fifth aspect, an embodiment of the present invention provides an information transmission apparatus, where the apparatus includes at least one processor, at least one network interface or another communications interface, a memory, and at least one communications bus; the memory is configured to store program instructions; and the processor is configured to perform the following steps according to the program instructions:

receiving a first session request sent by a third party application function, where the first session request includes identity information of the third party application function and identity information of a destination entity in a network;

establishing a first session with the third party application function, and sending a second session request to the destination entity in the network, where the second session request includes identity information of an anchor entity and the identity information of the third party application function;

establishing a second session with the destination entity in the network, and receiving information reported by the destination entity in the network, where the information includes a report event and identity information of the third party application function; and forwarding the report event to the corresponding third party application function according to the identity information of the third party application function, where the identity information of the third party application function is included in the information.

In a first possible implementation manner of the fifth aspect, the receiving a first session request sent by a third party application function includes:

establishing a websocket connection to the third party application function by means of one handshake; and receiving the first session request that is transmitted over the websocket connection by the third party application function.

In a second possible implementation manner of the fifth aspect, the processor maintains a list corresponding to the destination entity in the network, identity information of all third party application functions corresponding to the destination entity in the network is added in the list, and the processor is further configured to perform the following steps:

receiving a session termination request sent by a to-be-terminated third party application function, where the session termination request includes identity information of the to-be-terminated third party application function; and determining whether only the identity information of the to-be-terminated third party application function is saved in the list; if it is determined that only the identity information of the to-be-terminated third party application function is saved in the list, emptying the list and terminating the second session; and if it is determined that the identity information of the to-be-terminated third party application function is not the only identity information that is saved in the list, deleting the identity information of the to-be-terminated third party application function that is saved in the list.

With reference to the second possible implementation manner of the fifth aspect, in a third possible implementation manner, the processor further establishes a second session with other destination entities in a network according to a request of the third party application function, and maintains a list corresponding to each of the other destination entities in the network; and identity information of all third party application functions corresponding to the other destination entities in the network is added in the list, so that the session termination request further includes the identity information of the destination entity in the network, and the processor is further configured to perform the following steps:

searching for a list, which is corresponding to the identity information of the destination entity in the network, from at least two maintained lists; and performing the step of determining whether only the identity information of the to-be-terminated third party application function is saved in the list.

According to the information transmission method and apparatus in the embodiments of the present invention, when establishing a Diameter session with a destination entity in a network according to a request of a third party application function, an anchor entity sends identity information of the third party application function to the destination entity in the network, so that when the destination entity in the network collects a network event that needs to be reported to the third party application function, the destination entity in the network may add the identity information of the third party application function to report information, and send the identity information of the third party application function together with the network event to the anchor entity. In this way, according to the identity information, the anchor entity can correctly forward the network event to the corresponding third party application function to implement correct identification and forwarding of a packet flow.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In order to enable a person skilled in the art to better understand the solutions in the embodiments of the present invention, the following describes the embodiments of the present invention in further detail with reference to the accompanying drawings and implementation manners.

Before the technical solutions of the present invention are introduced, application scenarios of the present invention are described first.

That a user visits a video website by using a user equipment is used as an example. In this process, an application function server of the video website is used as a third party application function and requests to establish a session with a policy and charging rules function PCRF (that is, a destination entity in a network in the present invention) in an operator network, so as to implement accurate charging. In this case, the application function first establishes an HTTP connection to an edge device (that is, an anchor entity in the present invention; the anchor entity may be directly exposed to a third party; for example, the anchor entity may be a Protocol Converter) in the operator network; and then, the Protocol Converter establishes a Diameter session with the PCRF and finally a session between the third party and the user equipment is implemented.

Figure 1:
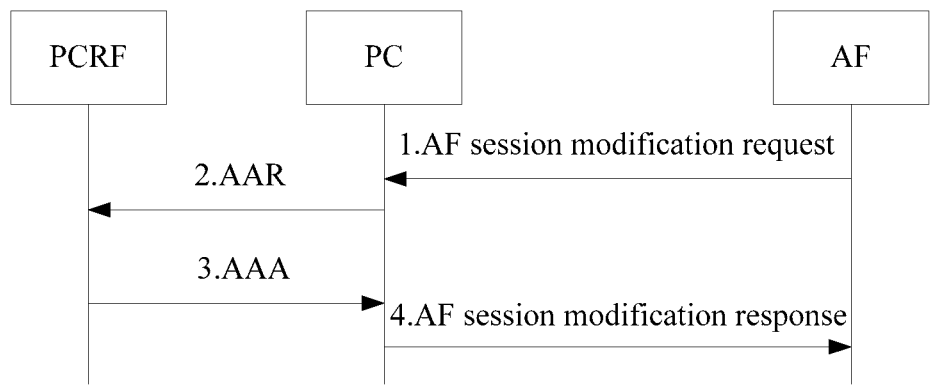
FIG. 1 is a schematic diagram of interaction between an application function AF and a PCRF by using a Protocol Converter PC.
Figure 2:
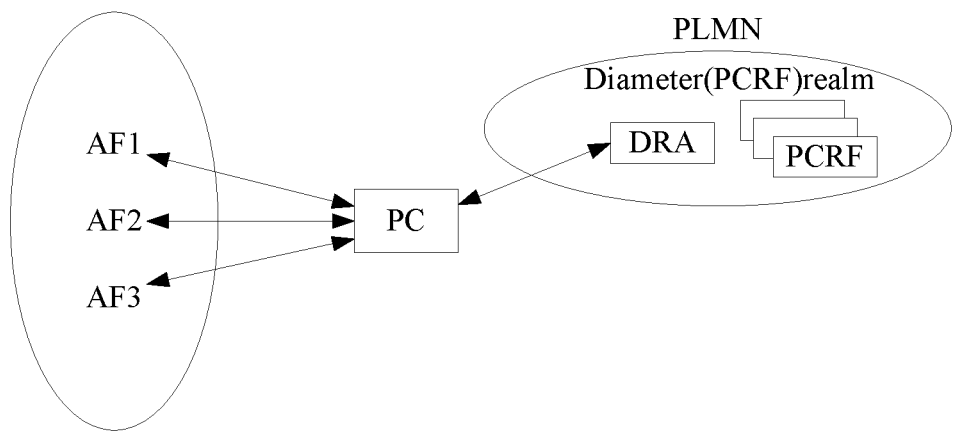
FIG. 2 is a schematic diagram of addressing one PCRF by multiple application functions AF1, AF2 and AF3 by using one Protocol Converter.

In an actual application process, a case in which multiple application functions address a same PCRF by using a same Protocol Converter may occur. As shown in FIG. 2, three application functions (which are an AF1, an AF2, and an AF3) simultaneously access a PCRF by using a Protocol Converter. If the PCRF collects a network event that needs to be reported to the AF1, the Protocol Converter cannot determine that the network event is to be forwarded to which one of the three application functions when the event is to be forwarded by using the Protocol Converter. That is, the solutions of the present invention are mainly intended to solve a flow identification problem on a same anchor entity, where the flow identification problem is caused when multiple third party application functions address one destination entity in a network by using one anchor entity.

The following describes the solutions of the present invention with reference to the accompanying drawings.

Figure 3:
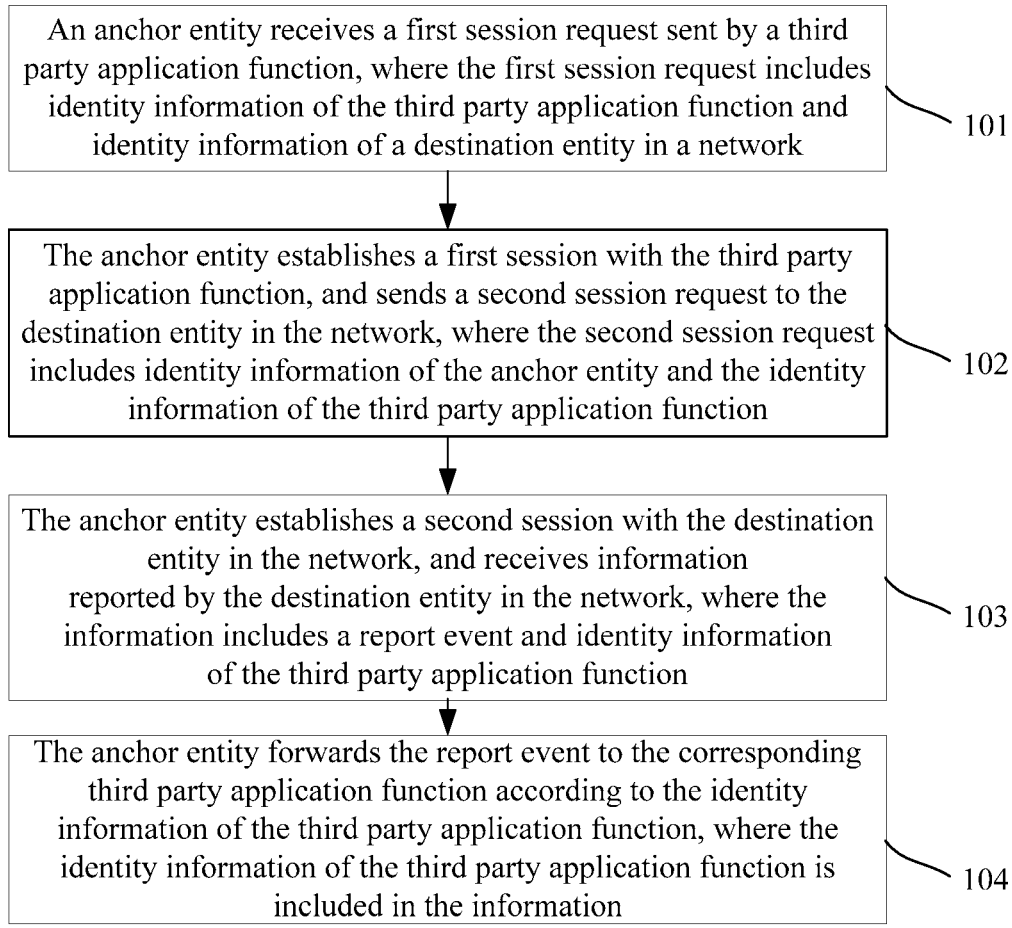
FIG. 3 is a flowchart of Embodiment 1 of an information transmission method on an anchor entity side according to an embodiment of the present invention.

Referring to FIG. 3, FIG. 3 is a flowchart of Embodiment 1 of an information transmission method on an anchor entity side according to an embodiment of the present invention, where the method may include:

Step 101: An anchor entity receives a first session request sent by a third party application function, where the first session request includes identity information of the third party application function and identity information of a destination entity in a network.

As a session initiator, an application function first sends a first session request to a Protocol Converter, so as to establish an HTTP session between the third party application function and the anchor entity, and the first session request includes at least the following two pieces of information:

(1) The Identity Information of the Third Party Application Function

This information mainly has two functions: A first function is to make the Protocol Converter clear about which third party to which the Protocol Converter currently establishes an HTTP connection, so that the Protocol Converter performs validity authentication on the application function to determine whether the application function has permission to access an operator network, which is not described in detail in this embodiment of the present invention; and a second function is that the Protocol Converter transmits this information to a PCRF with which the application function requests to establish a session, so that when subsequently reporting a network event, the PCRF may add this information to report information, where the information is used as a basis for the Protocol Converter to perform flow identification, for which reference may be made to the following introduction.

It should be noted that, the identity information of the third party application function outside an operator mobile communications network may be at least one of the following: an Internet Protocol (IP) address (IPv4 address or IPv6 address) of the application function, a uniform resource locator (URL), an identifier of a connection between the third party application function and the anchor entity, which is not specifically limited in this embodiment of the present invention. According to different message transmission mechanisms used between the third party application function and the anchor entity, the identifier of the connection may be: a websocket connection identifier specifically, if a first session is established by using a websocket; or an HTTP connection identifier specifically, if a first session is established by using HTTP2.0.

(2) The Identity Information of the Destination Entity in the Network

This information is mainly to make the Protocol Converter clear about an object with which the application function currently expects to establish a session, so that the Protocol Converter correctly initiates a second session request to the object to establish a Diameter session.

It should be noted that, the identity information of the destination entity in the network may be: a Diameter host identity of the PCRF and an identity of a Diameter realm in which the PCRF is located. In this case, the third party application function addresses the destination entity PCRF in the network according to identity information of a user equipment, determines an identity of the PCRF (which may be a Diameter host name and/or an IP address of the PCRF) and the identity of the Diameter realm in which the PCRF is located, and sends the two identities, which are used as the identity information of the destination entity in the network, to the Protocol Converter. This is mainly because a correspondence between identity information of a user equipment and identity information of a PCRF may be pre-configured in the third party application function. Therefore, in a case in which the third party application function learns the identity information of the user equipment, the identity information of the PCRF may be obtained by searching for a configured relationship.

Alternatively, the identity information of the destination entity in the network may also be: identity information of a user equipment, for example, an IP address, an IMSI (International Mobile Subscriber Identification), and an MSISDN (Mobile Station International ISDN number) of the user equipment, which may not be specifically limited in this embodiment of the present invention. In this case, the third party application function directly uses the identity information of the user equipment that is used for initial addressing as input information for addressing a destination entity in a network and sends the information to the Protocol Converter, and the Protocol Converter addresses a destination entity in a network PCRF according to the information, to determine an identity of the PCRF and an identity of a Diameter realm in which the PCRF is located, so as to perform a subsequent session establishing process. A correspondence between identity information of a user equipment and identity information of a PCRF may be pre-configured in the anchor entity Protocol Converter. Therefore, in a case in which the anchor entity Protocol Converter learns the identity information of the user equipment, the identity information of the PCRF may be obtained by searching for a configured relationship. When it is considered that the third party application function is a device outside an operator network, if an out-of-network device has permission to address identity information of a destination entity in a network in a Diameter realm, obviously, security of the destination entity in the network is relatively low. Therefore, in this manner, the identity information of the user equipment is used as the input information for addressing the destination entity in the network, and the anchor entity Protocol Converter in the network addresses the destination entity in the network, so that security of a session between the third party application function and the destination entity in the network can be improved.

Figure 4:
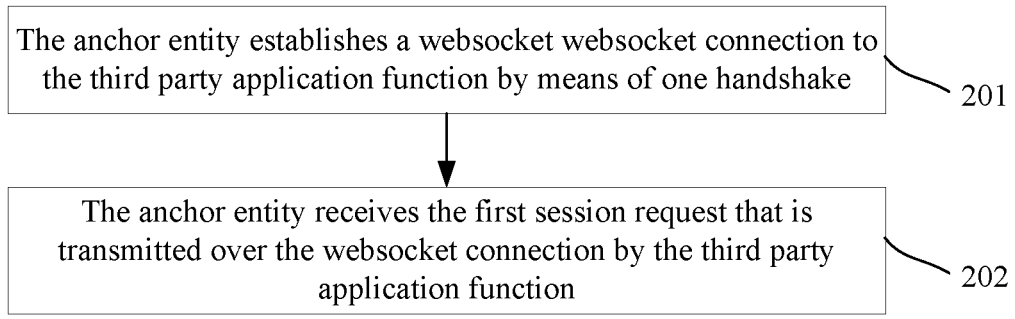
FIG. 4 is a flowchart of receiving by an anchor entity a first session request sent by a third party application function according to an embodiment of the present invention.

In this step, a manner in which the anchor entity receives the first session request sent by the third party application function may be implemented by multiple XML message transmission mechanisms, such as a technology such as a websocket or HTTP2.0. A websocket manner is used as an example in the following to describe specific implementation of this step. For details, reference may be made to the flowchart shown in FIG. 4.

Step 201: The anchor entity establishes a websocket connection to the third party application function by means of one handshake.

Step 202: The anchor entity receives the first session request that is transmitted over the websocket connection by the third party application function.

A websocket provides a TCP (Transmission Control Protocol) connection between the anchor entity and the third party application function in a full-duplex and real-time mode. Each websocket connection established on the TCP connection is corresponding to one session between the third party application function and the anchor entity, thereby effectively overcoming a limitation that in a traditional HTTP mechanism, a third party application function is always used as an HTTP client to initiate an HTTP session, and only HTTP long-polling or an HTTP flow mechanism can be used for event reporting of an anchor entity to perform non-real-time function adaption.

When a websocket connection is to be established, the third party application function sends an HTTP GET Upgrade request to the anchor entity, so as to request to establish a new websocket connection; correspondingly, after performing authentication on the third party application function successfully, the anchor entity returns a Switching Protocol response message to the third party application function to indicate that the websocket connection between the third party application function and the anchor entity is successfully established. In this way, on the established websocket connection, an HTTP session message between the third party application function and the anchor entity may be encapsulated into an Onmessage method, and a Send method may be invoked to transmit the session message. For example, the HTTP session message between the third party application function and the anchor entity: all procedure messages such as application function session establishment, application function session modification, application function session termination, and traffic plane event reporting may be encapsulated into the Onmessage method, and an entity on one end invokes the Send method to send the message to an entity on the other end.

In addition, it should be noted that, after communication between the anchor entity and the third party application function ends and the HTTP session is terminated, the third party application function may invoke a close method to release a resource, which includes a TCP resource at a transport layer, occupied by the websocket connection.

Step 102: The anchor entity establishes a first session with the third party application function, and sends a second session request to the destination entity in the network, where the second session request includes identity information of the anchor entity and the identity information of the third party application function.

After receiving the first session request sent by the third party application function, the anchor entity may establish the first session, that is an HTTP connection, with the corresponding third party application function according to the identity information of the third party application function, where the identity information of the third party application function is included in the request; meanwhile, the anchor entity may further send the second session request to the corresponding destination entity in the network according to the identity information of the destination entity in the network, so as to establish a Diameter session between the anchor entity and the destination entity in the network, where the identity information of the destination entity in the network is included in the request.

It should be noted that, the second session request includes at least the following two pieces of information:

(1) The identity information of the third party application function: that is, the identity information of the third party application function in the first session request sent to the anchor entity in step 101, so that the destination entity in the network can learn a third party that requests to establish a session with the destination entity in the network, and after acquiring a network event, the destination entity in the network may further instruct the anchor entity to correctly perform flow identification; and (2) The identity information of the anchor entity, which enables the destination entity in the network to clearly learn who requests to establish a second session with the destination entity in the network, where the identity information of the anchor entity may be specifically a Diameter host identity of the anchor entity and an identity of a Diameter realm in which the anchor entity is located.

In addition, the second session request may further includes the identity information of the destination entity in the network, so that the destination entity in the network determines whether the second session request is sent to the destination entity in the network, which may not be specifically limited in this embodiment of the present invention.

Step 103: The anchor entity establishes a second session with the destination entity in the network, and receives information reported by the destination entity in the network, where the information includes a report event and identity information of the third party application function.

Step 104: The anchor entity forwards the report event to the corresponding third party application function according to the identity information of the third party application function, where the identity information of the third party application function is included in the information.

After the anchor entity and the destination entity in the network establish the second session, that is, a Diameter session, if the destination entity in the network collects a network event that needs to be reported to the third party application function, the destination entity in the network sends report information to the anchor entity, and the anchor entity forwards the information. Specifically, in addition to the network event that needs to be reported, the report information should further include identity information of a third party application function corresponding to the network event, so that the anchor entity may perform flow identification according to the identity information, and then correctly forward the network event included in the report information to the corresponding third party application function, thereby solving a problem of flow identification.

It should be noted that, as described in the foregoing, after receiving the first session request, the anchor entity may perform the following actions: establishing the first session between the anchor entity and the third party application function, and sending the second session request to the destination entity in the network. In addition, the anchor entity may further establish and maintain a list corresponding to the destination entity in the network, and identity information of all third party application functions corresponding to the destination entity in the network is added in the list, that is, identity information of all third party application functions that address a same destination entity in a network by using a same anchor entity is added in the list. Referring to an example shown in FIG. 2, in a list that is established and maintained by the Protocol Converter and is corresponding to the PCRF, identity information of the AF1, the AF2, and the AF3 is added in the list. That is, one list maintained by the anchor entity is corresponding to one destination entity in a network, that is, is also corresponding to one second session established by the anchor entity and the destination entity in the network.

Based on the list maintained by the anchor entity, this embodiment of the present invention further provides two solutions for terminating a session, which are described in the following one by one.

Solution 1

Figure 5:
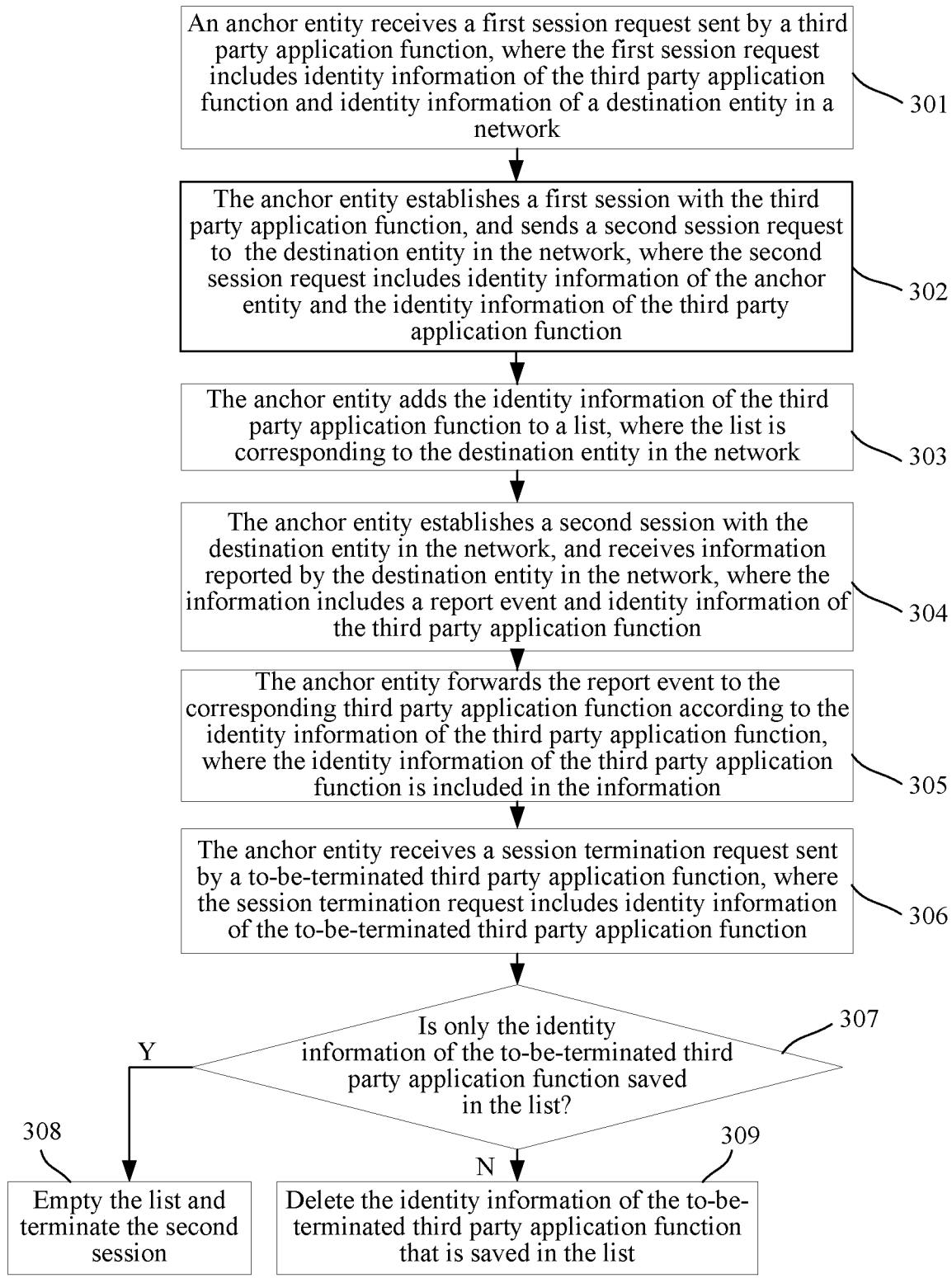
FIG. 5 is a flowchart of Embodiment 2 of an information transmission method on an anchor entity side according to an embodiment of the present invention.

Referring to FIG. 5, FIG. 5 is a flowchart of Embodiment 2 of an information transmission method on an anchor entity side according to an embodiment of the present invention, where the method may include:

Step 301: An anchor entity receives a first session request sent by a third party application function, where the first session request includes identity information of the third party application function and identity information of a destination entity in a network.

Step 302: The anchor entity establishes a first session with the third party application function, and sends a second session request to the destination entity in the network, where the second session request includes identity information of the anchor entity and the identity information of the third party application function.

Step 301 and step 302 are the same as step 101 and step 102, and details are not described herein again.

Step 303: The anchor entity adds the identity information of the third party application function to a list, where the list is corresponding to the destination entity in the network.

It should be noted that, a performing sequence of three actions, that is, establishing the first session with the third party application function by the anchor entity, sending the second session request to the destination entity in the network by the anchor entity, and adding the identity information of the third party application function to the list by the anchor entity, does not affect the technical effect of this embodiment of the present invention, and therefore this embodiment of the present invention does not impose a strict limitation thereto.

Step 304: The anchor entity establishes a second session with the destination entity in the network, and receives information reported by the destination entity in the network, where the information includes a report event and identity information of the third party application function.

Step 305: The anchor entity forwards the report event to the corresponding third party application function according to the identity information of the third party application function, where the identity information of the third party application function is included in the information.

Step 304 and step 305 are the same as step 103 and step 104, and details are not described herein again.

Step 306: The anchor entity receives a session termination request sent by a to-be-terminated third party application function, where the session termination request includes identity information of the to-be-terminated third party application function.

If a case in which a session needs to be terminated in a session process occurs, for example, a user loses contact with a third party network, or a third party network determines that congestion occurs in an area, so that some users with a relatively low priority need to be terminated so as to ease the congestion, and the third party application function sends a session termination request to the anchor entity so as to terminate a session that does not need to be maintained.

For example, as shown in FIG. 2, when the AF1 needs to terminate a first session with the Protocol Converter, the AF1, used as a to-be-terminated third party application function, sends a session termination request to the Protocol Converter.

Step 307: The anchor entity determines whether only the identity information of the to-be-terminated third party application function is saved in the list; if the anchor entity determines that only the identity information of the to-be-terminated third party application function is saved in the list, perform step 308, that is, the anchor entity empties the list and terminates the second session; and if the anchor entity determines that the identity information of the to-be-terminated third party application function is not the only identity information that is saved in the list, perform step 309, that is, the anchor entity deletes the identity information of the to-be-terminated third party application function that is saved in the list.

After receiving the session termination request sent by the to-be-terminated third party application function, the anchor entity checks the list maintained by the anchor entity and performs differential processing according to a check result:

(1) If only the identity information of the to-be-terminated third party application function is added in the list, it indicates that a reason that the anchor entity maintains the second session with the destination entity in the network in this case is to forward a network event acquired by the destination entity in the network to the to-be-terminated third party application function; if in this case the sole third party application function also needs to terminate the session, the anchor entity does not need to maintain the second session; therefore, the anchor entity may directly terminate the second session, that is, the Diameter session, between the anchor entity and the destination entity in the network; and meanwhile, the anchor entity may further empty the list and release a resource occupied by the list, and terminate the first session with the third party application function.

(2) If in addition to the identity information of the to-be-terminated third party application function, identity information of another third party application function is further saved in the list, for example, the AF1 requests to terminate a session, but the list maintained by the anchor entity further saves identity information of the AF2 and the AF3, and in this case, to ensure that after terminating the session with AF1, the anchor entity can still normally forward a network event to the AF2 and the AF3, the anchor entity should continue to maintain the second session with the destination entity in the network. Meanwhile, the anchor entity should further delete the identity information of the to-be-terminated third party application function that is saved in a local list, and terminate the first session with the to-be-terminated third party application function. That is, in the foregoing example, an HTTP connection between the Protocol Converter and the AF1 is terminated, and HTTP connections between the Protocol Converter and the AF2 and between the Protocol Converter and AF3 continue to be maintained.

(3) If the identity information of the to-be-terminated third party application function is not found in the list, the anchor entity may not perform any processing on the session termination request. Certainly, the anchor entity may send an error alarm, which may not be specifically limited in this embodiment of the present invention.

Solution 2

As described in the foregoing solution 1, the anchor entity may maintain only one list, that is, the anchor entity establishes sessions between multiple third party application functions and a same destination entity in a network. Correspondingly, identity information of the multiple third party application functions that establish the sessions with the destination entity in the network is saved in the list. It may also be understood as that a Diameter session between the anchor entity and the destination entity in the network is corresponding to the list.

In addition, the anchor entity establishes sessions between multiple third party application function and different destination entities in a network. Correspondingly, the anchor entity needs to maintain multiple lists, that is, the anchor entity maintains one list for each destination entity in a network, where each list is used to save identity information of each of multiple third party application functions of a corresponding destination entity in a network. It may also be understood as that each list is corresponding to a Diameter session (it should be noted that, in a normal case, the anchor entity and a destination entity in a network establish only one Diameter session at a same moment) between the anchor entity and a destination entity in a network among multiple destination entities in the network.

For example, a Protocol Converter PC1 acts as a proxy of a PCRF1 and establishes a session between the PCRF1 and each of the AF1, the AF2, and the AF3. Meanwhile, the Protocol Converter PC1 may continue to act as a proxy of a PCRF2 and establish a session between the PCRF2 and each of an AF4 and an AF5; may act as a proxy of a PCRF3 and establish a session between the PCRF3 and an AF6; and even may establish sessions between more application functions and a PCRF, which is only used as a reference example for description and is not described again. In this case, the anchor entity needs to create and maintain at least two lists, and each list is corresponding to one destination entity in a network. As described in the foregoing example, the Protocol Converter PC1 needs to maintain three lists, where one list is corresponding to a Diameter session between the Protocol Converter PC1 and the PCRF 1, and the identity information of the AF1, the AF2, and the AF3 are added in the list; one list is corresponding to a Diameter session between the Protocol Converter PC1 and the PCRF2, and the identity information of AF4 and AF5 are added in the list; and one list is corresponding to a Diameter session between the Protocol Converter PC1 and the PCRF3, and the identity information of AF6 is added in the list.

Figure 6:
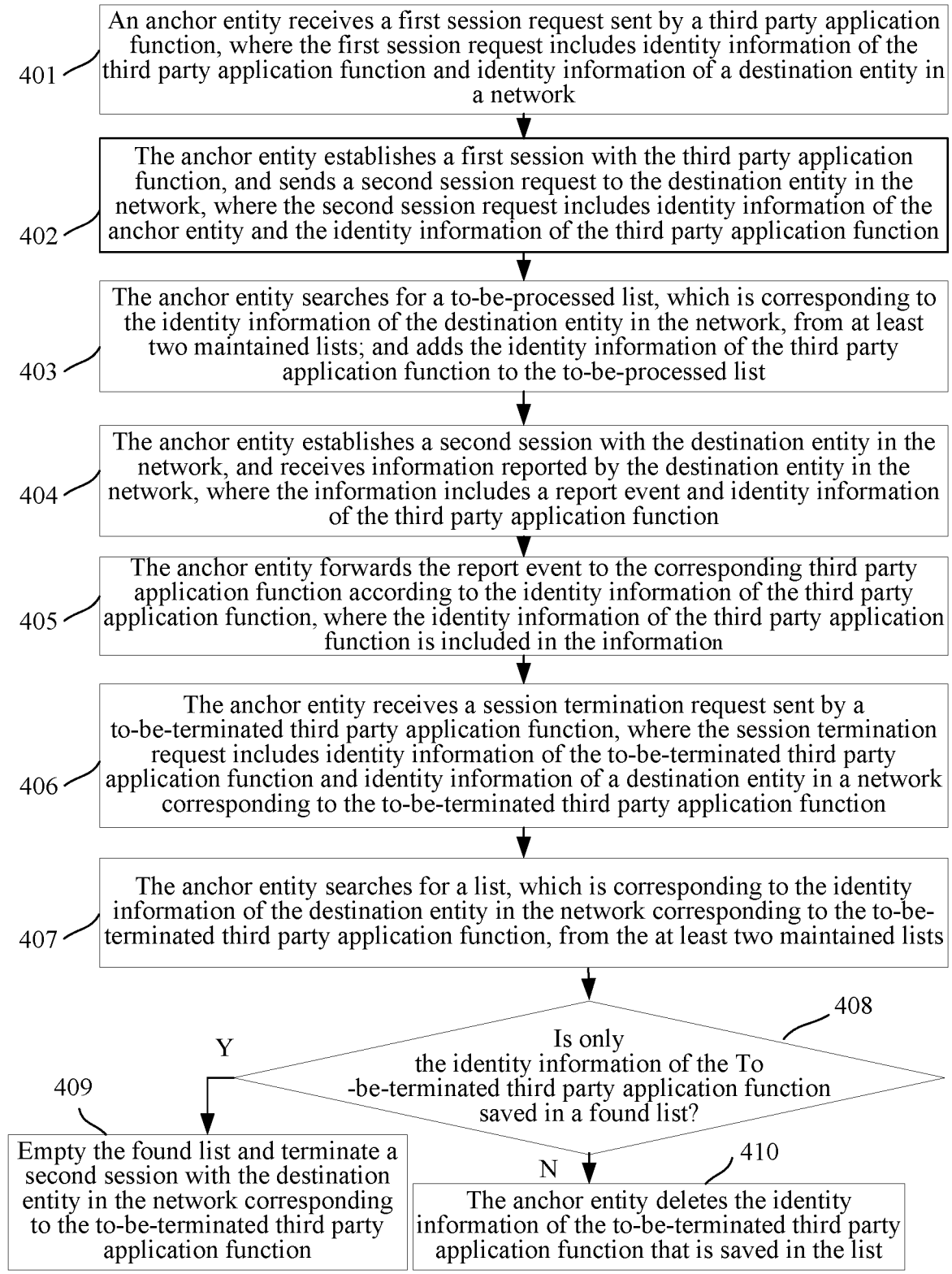
FIG. 6 is a flowchart of Embodiment 3 of an information transmission method on an anchor entity side according to an embodiment of the present invention.

Based on the solution that the anchor entity maintains at least two lists, an embodiment of the present invention further provides Embodiment 3 of an information transmission method on an anchor entity side. Referring to FIG. 6, the method may include:

Step 401: An anchor entity receives a first session request sent by a third party application function, where the first session request includes identity information of the third party application function and identity information of a destination entity in a network.

Step 402: The anchor entity establishes a first session with the third party application function, and sends a second session request to the destination entity in the network, where the second session request includes identity information of the anchor entity and the identity information of the third party application function.

Step 401 and step 402 are the same as step 101 and step 102, and details are not described herein again.

Step 403: The anchor entity searches for a to-be-processed list, which is corresponding to the identity information of the destination entity in the network, from at least two maintained lists; and adds the identity information of the third party application function to the to-be-processed list.

It should be noted that, a performing sequence of three actions, that is, establishing the first session with the third party application function by the anchor entity, sending the second session request to the destination entity in the network by the anchor entity, and adding the identity information of the third party application function to the to-be-processed list by the anchor entity, does not affect the technical effect of this embodiment of the present invention, and therefore this embodiment of the present invention does not impose a strict limitation thereto.

Step 404: The anchor entity establishes a second session with the destination entity in the network, and receives information reported by the destination entity in the network, where the information includes a report event and identity information of the third party application function.

Step 405: The anchor entity forwards the report event to the corresponding third party application function according to the identity information of the third party application function, where the identity information of the third party application function is included in the information.

Step 404 and step 405 are the same as step 103 and step 104, and details are not described herein again.

Step 406: The anchor entity receives a session termination request sent by a to-be-terminated third party application function, where the session termination request includes identity information of the to-be-terminated third party application function and identity information of a destination entity in a network corresponding to the to-be-terminated third party application function.

Step 407: The anchor entity searches for a list, which is corresponding to the identity information of the destination entity in the network corresponding to the to-be-terminated third party application function, from the at least two maintained lists.

Step 408: The anchor entity determines whether only the identity information of the to-be-terminated third party application function is saved in a found list; if the anchor entity determines that only the identity information of the to-be-terminated third party application function is saved in the found list, perform step 409, that is, the anchor entity empties the found list and terminates a second session with the destination entity in the network corresponding to the to-be-terminated third party application function; and if the anchor entity determines that the identity information of the to-be-terminated third party application function is not the only identity information that is saved in the found list, perform step 410, that is, the anchor entity deletes the identity information of the to-be-terminated third party application function that is saved in the list.

Steps 408 to 410 are the same as steps 307 to 309, and details are not described herein again.

Alternatively, it should be noted that, for the solution that the anchor entity maintains at least two lists, the session termination request sent by the to-be-terminated third party application function may also include only the identity information of the to-be-terminated third party application function. Correspondingly, the anchor entity may search for each list one by one according to the identity information of the to-be-terminated third party application function, so as to terminate a session. Certainly, in the foregoing solution 2, a list to which the identity information of the to-be-terminated third party application function is added is found first according to the identity information of the destination entity in the network, and then the identity information is deleted from the list to terminate a session, so that session termination efficiency may be improved in this embodiment of the present invention.

An embodiment of the present invention further provides an information transmission process on a third party application function side, which is corresponding to the information transmission process on the anchor entity side introduced in the foregoing. Specifically, reference may be made to a flowchart of an information transmission method on a third party application function side shown in FIG. 7, and the method may include:

Step 501: A third party application function sends a first session request to an anchor entity, where the first session request includes identity information of the third party application function and identity information of a destination entity in a network, and the identity information of the third party application function is used to be forwarded to the destination entity in the network when the anchor entity sends a second session request to the destination entity in the network.

Step 502: The third party application function receives a response returned by the anchor entity, and establishes a first session with the anchor entity.

Step 503: After the anchor entity and the destination entity in the network establish a second session, the third party application function receives a report event that is forwarded by the anchor entity according to the identity information of the third party application function, where identity information of the third party application function and the report event are sent by the destination entity in the network to the anchor entity.

Mainly from the perspective of the third party application function side, this embodiment describes an information transmission process of the present invention. Similarly, in this embodiment, the following two sessions also need to be established:

1. First Session

The first session is initiated by the third party application function to the anchor entity for establishment. For a specific process, reference may be made to the foregoing introduction; and details are not described herein again. It should be emphasized and noted that, in addition to being used when the anchor entity and the third party application function establish the first session (which mainly means performing validity authentication on the third party application function), the identity information of the third party application function in the first session request is further used to be added to the second session request, and the anchor entity sends the identity information to the destination entity in the network. In this way, when the destination entity in the network collects a report event, the destination entity in the network may send the information and the report event together to the anchor entity, so that the anchor entity performs flow identification according to the information and correctly forwards the report event to the third party application function.

Specifically, a process of sending the first session request to the anchor entity by the third party application function may be as follows: The third party application function establishes a websocket connection to the anchor entity by means of one handshake; and the third party application function transmits the first session request to the anchor entity over the web socket connection.

2. Second Session

After establishing the first session with the third party application function, the anchor entity may be trigged to send the second session request to the destination entity in the network (identified by using the identity information of the destination entity in the network that is included in the first session request) with which the third party application function requests to establish a session, so as to request to establish a second session with the destination entity in the network; and meanwhile, sends the identity information of the third party application function to the destination entity in the network for saving. For a specific process of establishing the second session, reference may be made to the foregoing introduction, and details are not described herein again.

After the third party application function and the anchor entity establish the first session and the anchor entity and the destination entity in the network establish the second session, if the destination entity in the network collects an event that needs to be reported to the third party application function, the destination entity in the network sends the report event and an object of the event (that is, the identity information of the third party application function) to the anchor entity, so that the anchor entity correctly forwards the report event to the object of the event according to the identity information of the third party application function.

Figure 8:
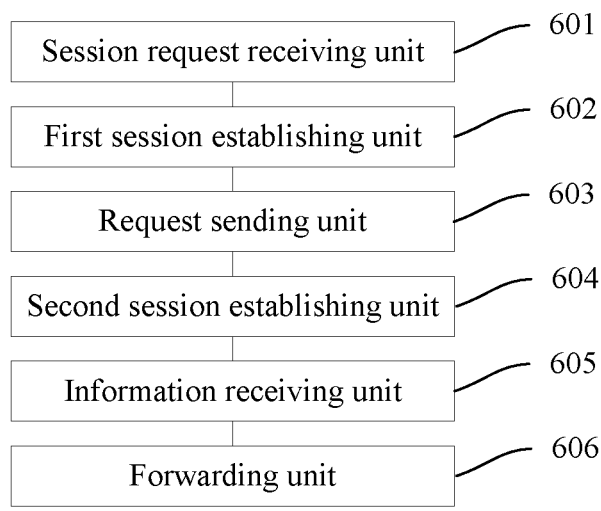
FIG. 8 is a schematic diagram of an information transmission apparatus on an anchor entity side according to an embodiment of the present invention.

Correspondingly, an embodiment of the present invention further provides an information transmission apparatus, that is, the foregoing anchor entity, corresponding to the method shown in FIG. 3. Referring to FIG. 8, FIG. 8 is a schematic diagram of Embodiment 1 of an information transmission apparatus, where the apparatus may include:

a session request receiving unit 601, configured to receive a first session request sent by a third party application function, where the first session request includes identity information of the third party application function and identity information of a destination entity in a network;

a first session establishing unit 602, configured to establish a first session with the third party application function;

a request sending unit 603, configured to send a second session request to the destination entity in the network, where the second session request includes identity information of an anchor entity and the identity information of the third party application function;

a second session establishing unit 604, configured to establish a second session with the destination entity in the network;

an information receiving unit 605, configured to receive information reported by the destination entity in the network, where the information includes a report event and identity information of the third party application function; and a forwarding unit 606, configured to forward the report event to the corresponding third party application function according to the identity information of the third party application function, where the identity information of the third party application function is included in the information.

Figure 9:
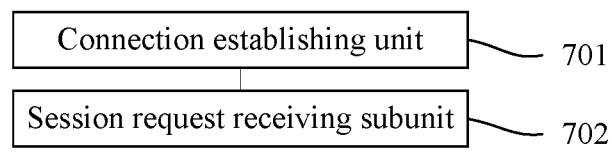
FIG. 9 is a schematic diagram of a session request receiving unit according to an embodiment of the present invention.

Referring to a schematic diagram shown in FIG. 9, as a possible implementation manner, the session request receiving unit may include:

a connection establishing unit 701, configured to establish a websocket connection to the third party application function by means of one handshake; and a session request receiving subunit 702, configured to receive the first session request that is transmitted over the websocket connection by the third party application function.

Corresponding to the method Embodiment 2 shown in FIG. 5, if the information transmission apparatus in this embodiment of the present invention further maintains a list corresponding to the destination entity in the network, identity information of all third party application functions corresponding to the destination entity in the network is added in the list, and based on the schematic diagram shown in FIG. 8, the information transmission apparatus may further include the following units:

a termination request receiving unit, configured to receive a session termination request sent by a to-be-terminated third party application function, where the session termination request includes identity information of the to-be-terminated third party application function;

a determining unit, configured to determine whether only the identity information of the to-be-terminated third party application function is saved in the list;

a session termination unit, configured to empty the list and terminate the second session, when the determining unit determines that only the identity information of the to-be-terminated third party application function is saved in the list; and a deletion unit, configured to delete the identity information of the to-be-terminated third party application function that is saved in the list, when the determining unit determines that the identity information of the to-be-terminated third party application function is not the only identity information that is saved in the list.

Corresponding to the method Embodiment 3 shown in FIG. 6, the information transmission apparatus in this embodiment of the present invention may further establish a second session with other destination entities in a network according to a request of the third party application function, and maintains a list corresponding to each of the other destination entities in the network; identity information of all third party application functions corresponding to the other destination entities in the network is added in the list, so that the session termination request received by the termination request receiving unit further includes the identity information of the destination entity in the network; and based on the schematic diagram shown in FIG. 8, the information transmission apparatus may further include the following units:

a termination request receiving unit, configured to receive a session termination request sent by a to-be-terminated third party application function, where the session termination request includes identity information of the to-be-terminated third party application function;

a searching unit, configured to search for a list, which is corresponding to the identity information of the destination entity in the network, from at least two maintained lists;

a determining unit, configured to determine whether only the identity information of the to-be-terminated third party application function is saved in a list found by the searching unit;

a session termination unit, configured to empty the list and terminate a second session with the destination entity in the network corresponding to the to-be-terminated third party application function, when the determining unit determines that only the identity information of the to-be-terminated third party application function is saved in the list found by the searching unit; and a deletion unit, configured to delete the identity information of the to-be-terminated third party application function that is saved in the list, when the determining unit determines that the identity information of the to-be-terminated third party application function is not the only identity information that is saved in the list found by the searching unit.

Figure 7:
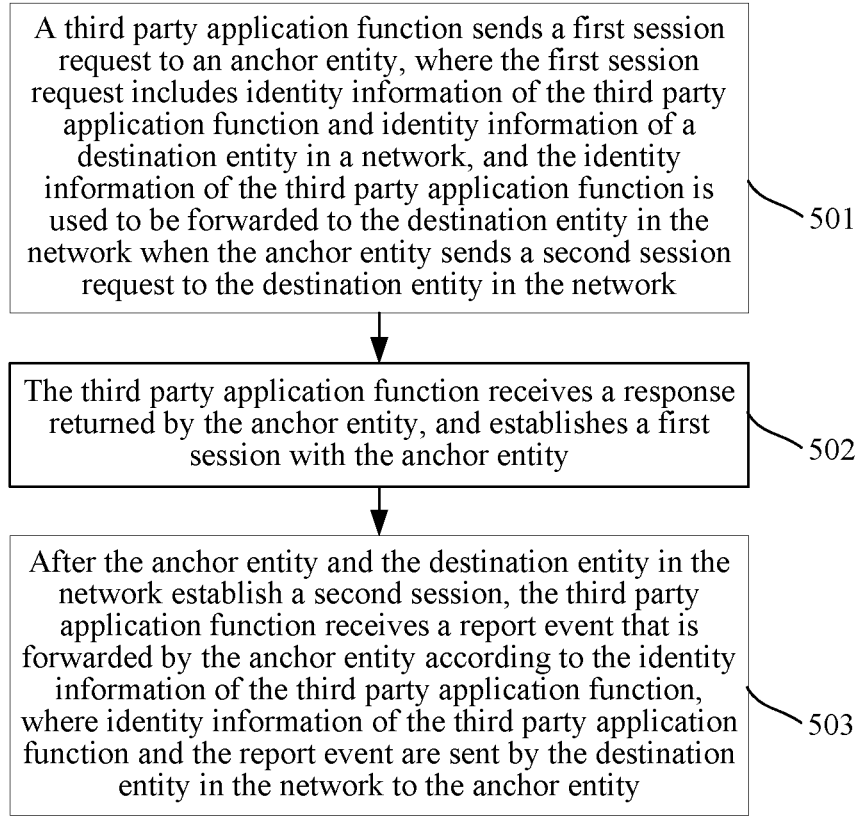
FIG. 7 is a flowchart of an information transmission method on a third party application function side according to an embodiment of the present invention.
Figure 10:
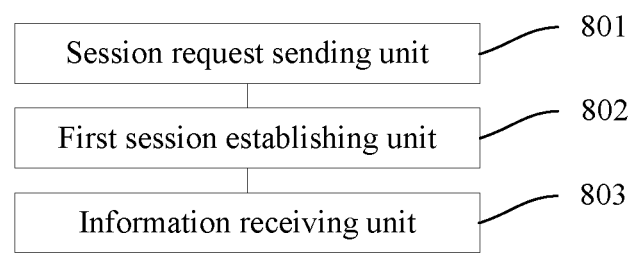
FIG. 10 is a schematic diagram of an information transmission apparatus on a third party application function side according to an embodiment of the present invention.

Correspondingly, an embodiment of the present invention further provides an information transmission apparatus, that is, the foregoing third party application function, corresponding to the method shown in FIG. 7. Referring to FIG. 10, FIG. 10 is a schematic diagram of an information transmission apparatus, where the apparatus may include:

a session request sending unit 801, configured to send a first session request to an anchor entity, where the first session request includes identity information of a third party application function and identity information of a destination entity in a network, and the identity information of the third party application function is used to be forwarded to the destination entity in the network when the anchor entity sends a second session request to the destination entity in the network;

a first session establishing unit 802, configured to receive a response returned by the anchor entity, and establish a first session with the anchor entity; and an information receiving unit 803, configured to, after the anchor entity and the destination entity in the network establish a second session, receive a report event that is forwarded by the anchor entity according to the identity information of the third party application function, where identity information of the third party application function and the report event are sent by the destination entity in the network to the anchor entity.

Figure 11:
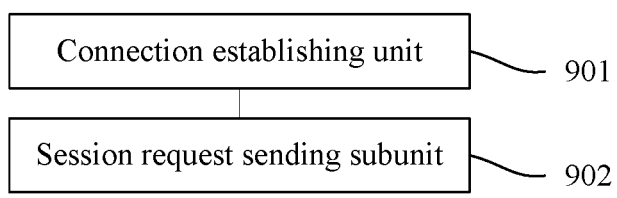
FIG. 11 is a schematic diagram of a session request sending unit according to an embodiment of the present invention.

Referring to a schematic diagram shown in FIG. 11, as a possible implementation manner, the session request sending unit may include:

a connection establishing unit 901, configured to establish a websocket connection to the anchor entity by means of one handshake; and a session request sending subunit 902, configured to transmit the first session request to the anchor entity over the websocket connection.

Further, an embodiment of the present invention further provides a composition of hardware of an information transmission apparatus on an anchor entity side and a composition of hardware of an information transmission apparatus on a third party application function side. The composition of hardware may include at least one processor (for example, a CPU), at least one network interface or another communications interface, a memory, and at least one communications bus that is used to implement connection communication among these apparatuses. The processor is configured to execute an executable module stored in the memory, for example, a computer program. The memory may include a high-speed random access memory (RAM) and may further include a non-volatile memory, for example, at least one disk memory. Through at least one network interface (with or without a cable), communication between a system gateway and at least one another network element may be implemented by using the Internet, a wide area network, a local area network, a metropolitan area network, and the like.

Figure 12:
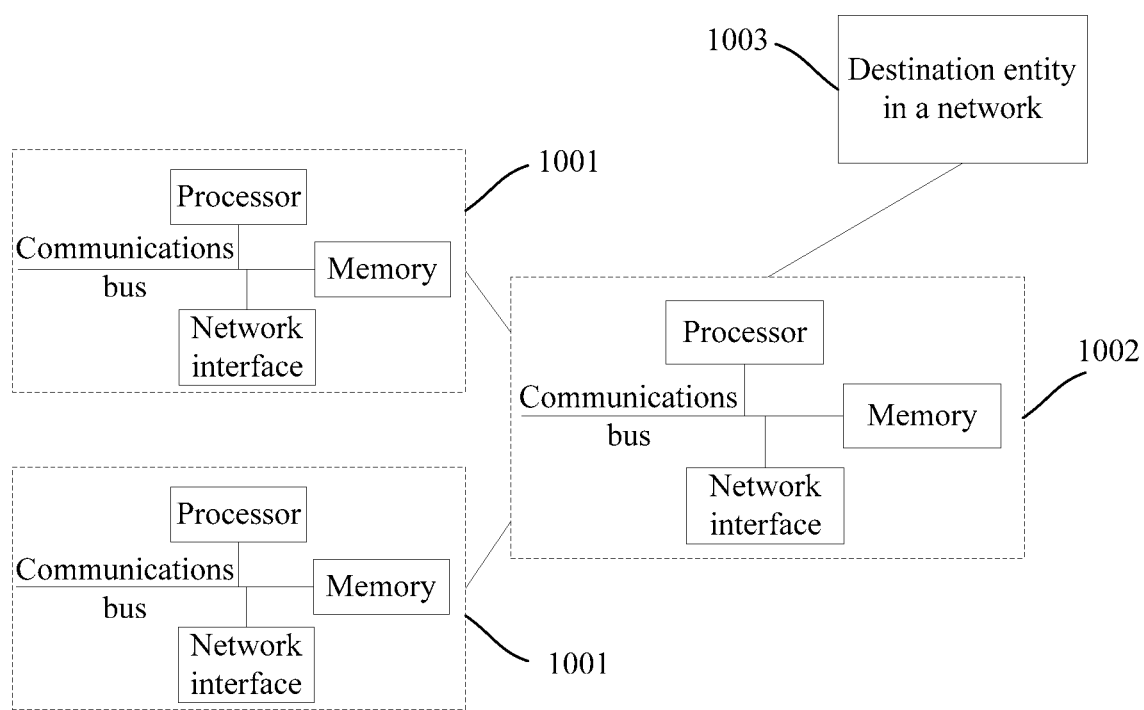
FIG. 12 is a composition schematic diagram of hardware of an information transmission system according to an embodiment of the present invention.

Referring to a schematic diagram of an information transmission system shown in FIG. 12, the system may include third party application functions 1001, an anchor entity 1002, and a destination entity in a network 1003.

A memory of each third party application function stores program instructions, and a processor of the third party application function may perform the following steps according to these program instructions:

sending a first session request to the anchor entity, where the first session request includes identity information of the third party application function and identity information of the destination entity in the network, where the identity information of the third party application function is used to be forwarded to the destination entity in the network when the anchor entity sends a second session request to the destination entity in the network;

receiving a response returned by the anchor entity, and establishing a first session with the anchor entity; and after the anchor entity and the destination entity in the network establish a second session, receiving a report event that is forwarded by the anchor entity according to the identity information of the third party application function, where identity information of the third party application function and the report event are sent by the destination entity in the network to the anchor entity.

Correspondingly, a memory of the anchor entity also stores program instructions, and a processor of the anchor entity may correspondingly perform the following steps according to the stored program instructions:

receiving the first session request sent by the third party application function, where the first session request includes the identity information of the third party application function and the identity information of the destination entity in the network;

establishing the first session with the third party application function, and sending the second session request to the destination entity in the network, where the second session request includes identity information of the anchor entity and the identity information of the third party application function;

establishing the second session with the destination entity in the network, and receiving information reported by the destination entity in the network, where the information includes the report event and identity information of the third party application function; and forwarding the report event to the corresponding third party application function according to the identity information of the third party application function, where the identity information of the third party application function is included in the information.

Based on the foregoing descriptions of the implementation manners, a person skilled in the art may clearly understand that some or all steps of the methods in the foregoing embodiments may be implemented by software in addition to a universal hardware platform. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network communications device such as a media gateway) to perform the methods described in the embodiments or some parts of the embodiments of the present invention.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the embodiments of the present invention without creative efforts.

The foregoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention. Additionally, statements made herein characterizing the invention refer to an embodiment of the invention and not necessarily all embodiments.

What is claimed is:

1. An information transmission method, comprising:
receiving, by an information transmission apparatus, a first session request sent by a third party application function, wherein the first session request comprises identity information of the third party application function and identity information of a destination entity in a network;
establishing, by the information transmission apparatus, a first session with the third party application function, and sending a second session request to the destination entity, wherein the second session request comprises identity information of the information transmission apparatus and the identity information of the third party application function;
establishing, by the information transmission apparatus, a second session with the destination entity, and receiving information reported by the destination entity, wherein the reported information comprises a report event and reported identity information of the third party application function;
forwarding, by the information transmission apparatus, the report event to the third party application function according to the reported identity information of the third party application function comprised in the reported information;
maintaining, by the information transmission apparatus, a list corresponding to the destination entity, the list comprising identity information of at least one third party application function corresponding to the destination entity;
receiving, by the information transmission apparatus, a session termination request sent by a to-be-terminated third party application function among the at least one third party application function, wherein the session termination request comprises identity information of the to-be-terminated third party application function; and
determining, by the information transmission apparatus, whether only the identity information of the to-be-terminated third party application function is saved in the list.

2. The method according to claim 1, wherein the identity information of the third party application function of the first session request comprises a uniform resource locator (URL).

3. The method according to claim 1, wherein the identity information of the destination entity comprises identity information of a user equipment.

4. The method according to claim 1, wherein the identity information of the information transmission apparatus comprises a Diameter host identity of the information transmission apparatus and an identity of a Diameter realm in which the information transmission apparatus is located.

5. The method according to claim 1, wherein receiving the first session request comprises:
establishing, by the information transmission apparatus, a websocket connection to the third party application function via one handshake, wherein the first session request is transmitted over the websocket connection by the third party application function.

6. The method according to claim 1, further comprising:
emptying, by the information transmission apparatus, the list and terminating the second session based upon a determination that only the identity information of the to-be-terminated third party application function is saved in the list.

7. The method according to claim 1, further comprising:
deleting, by the information transmission apparatus, the identity information of the to-be-terminated third party application function from the list based upon a determination that the identity information of the to-be-terminated third party application function is not the only identity information that is saved in the list.

8. The method according to claim 1, further comprising:
establishing, by the information transmission apparatus, a session with a second destination entity and a session with a third destination entity; and
maintaining at least two lists, including a list corresponding to the second destination entity and a list corresponding to the third destination entity, each of the at least two lists comprising identity information of at least one third party application function corresponding to a respective destination entity;
wherein the session termination request further comprises the identity information of the destination entity;
wherein the method further comprises:
searching, by the information transmission apparatus, for a list corresponding to the identity information of the destination entity from the at least two maintained lists; and
determining whether only the identity information of the to-be-terminated third party application function is saved in a found list.

9. The method according to claim 1, wherein the reported identity information of the third party application function comprises an identifier of a connection.

10. An information transmission apparatus, comprising at least one processor and at least one non-transitory computer-readable memory having processor-executable instructions stored thereon, the processor-executable instructions, when executed, being configured to facilitate:
receiving a first session request sent by a third party application function, wherein the first session request comprises identity information of the third party application function and identity information of a destination entity in a network;
establishing a first session with the third party application function, and sending a second session request to the destination entity, wherein the second session request comprises identity information of the information transmission apparatus and the identity information of the third party application function;
establishing a second session with the destination entity, and receiving information reported by the destination entity, wherein the reported information comprises a report event and reported identity information of the third party application function; and
forwarding the report event to the third party application function according to the reported identity information of the third party application function comprised in the reported information;
wherein receiving the first session request comprises:
establishing a websocket connection to the third party application function via one handshake, wherein the first session request is transmitted over the websocket connection by the third party application function.

11. The information transmission apparatus according to claim 10, wherein the processor-executable instructions, when executed, further facilitate:

maintaining a list corresponding to the destination entity, the list comprising identity information of at least one third party application function corresponding to the destination entity;

receiving a session termination request sent by a to-be-terminated third party application function among the at least one third party application function, wherein the session termination request comprises identity information of the to-be-terminated third party application function; and determining whether only the identity information of the to-be-terminated third party application function is saved in the list.

12. The information transmission apparatus according to claim 11, wherein the processor-executable instructions, when executed, further facilitate:

emptying the list and terminating the second session based upon a determination that only the identity information of the to-be-terminated third party application function is saved in the list.

13. The information transmission apparatus according to claim 11, wherein the processor-executable instructions, when executed, further facilitate:

deleting the identity information of the to-be-terminated third party application function from the list based upon a determination that the identity information of the to-be-terminated third party application function is not the only identity information saved in the list.

14. The information transmission apparatus according to claim 11, wherein the processor-executable instructions, when executed, further facilitate:

establishing a session with a second destination entity and a session with a third destination entity; and maintaining at least two lists, including a list corresponding to the second destination entity and a list corresponding to the third destination entity, each of the at least two lists comprising identity information of at least one third party application function corresponding to a respective destination entity;

wherein the session termination request further comprises the identity information of the destination entity in the network;

wherein the processor-executable instructions, when executed, further facilitate:

searching for a list corresponding to the identity information of the destination entity from the at least two maintained lists; and determining whether only the identity information of the to-be-terminated third party application function is saved in a found list.

15. The information transmission apparatus according to claim 10, wherein the information transmission apparatus comprises a Protocol Converter.

16. The information transmission apparatus according to claim 10, wherein the destination entity comprises a policy and charging rules function (PCRF).

17. The information transmission apparatus according to claim 10, wherein the identity information of the destination entity in the network comprises identity information of a user equipment.

18. The information transmission apparatus according to claim 10, wherein the identity information of the information transmission apparatus comprises: a Diameter host identity of the information transmission apparatus and an identity of a Diameter realm in which the information transmission apparatus is located.

19. An information transmission apparatus, comprising at least one processor and at least one non-transitory computer-readable memory having processor-executable instructions stored thereon, the processor-executable instructions, when executed, being configured to facilitate:

receiving a first session request sent by a third party application function, wherein the first session request comprises identity information of the third party application function and identity information of a destination entity in a network;

establishing a first session with the third party application function, and sending a second session request to the destination entity, wherein the second session request comprises identity information of the information transmission apparatus and the identity information of the third party application function;

establishing a second session with the destination entity, and receiving information reported by the destination entity, wherein the reported information comprises a report event and reported identity information of the third party application function;

forwarding the report event to the third party application function according to the reported identity information of the third party application function comprised in the reported information;

maintaining a list corresponding to the destination entity, the list comprising identity information of at least one third party application function corresponding to the destination entity;

receiving a session termination request sent by a to-be-terminated third party application function among the at least one third party application function, wherein the session termination request comprises identity information of the to-be-terminated third party application function; and determining whether only the identity information of the to-be-terminated third party application function is saved in the list.

* * * * *